J. O. H. CAZENOVE.
SNAP FASTENER.
APPLICATION FILED MAY 24, 1920.

1,360,884.

Patented Nov. 30, 1920.

INVENTOR.
J. O. H. Cazenove.
BY Ray B. Whitman
ATTORNEY.

UNITED STATES PATENT OFFICE.

JAMES O. H. CAZENOVE, OF NEW YORK, N. Y., ASSIGNOR OF ONE-FOURTH TO RAY B. WHITMAN AND ONE-FOURTH TO CLAIR M. WHITMAN.

SNAP-FASTENER.

1,360,884.  Specification of Letters Patent.  Patented Nov. 30, 1920.

Application filed May 24, 1920. Serial No. 383,753.

*To all whom it may concern:*

Be it known that I, JAMES O. H. CAZENOVE, a citizen of the United States, and resident of New York, in the county of New York, and State of New York, have invented certain new and useful Improvements in Snap-Fasteners, of which the following is a specification.

This invention relates to spring buttons or fastening devices for fabrics or similar material in which stud and socket members are employed to be inserted one with the other.

An object of this invention is, first, to obtain increased resiliency by providing spring portions in both stud and socket members, thereby securing a more reliable snap or locking action; second, to simplify the method of attaching the two members of the fastener to the fabrics or other material on which the fastener is to be used; third, to reduce the number of parts necessary for a complete fastener; and fourth, to provide a fastener which will withal be simple and inexpensive in construction and convenient in operation.

These and other objects will be more fully brought out in the following specification, illustrated in the drawing, and covered in the appended claims.

In the drawings—

Figure 8:
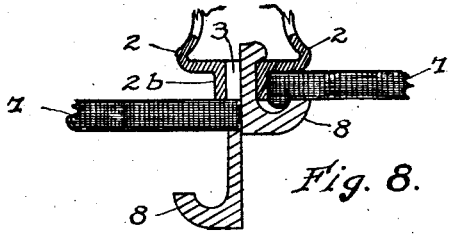

Fig. 8 is a composite sectional view of the base portion of the stud member, showing, to the left of the vertical axis, the relative positions of the rivet, fabric, and central opening in the annular base prior to attachment; and, to the right of said axis, their relative position after the rivet stem has been pushed through the said fabric and central opening and its end upset or spread above said opening.

Like reference numerals indicate like parts throughout the different views.

The socket member of this invention comprises two main elements—the spring portion 1 of sheet metal and the cover or cap 5 of any suitable material.

Figure 1:
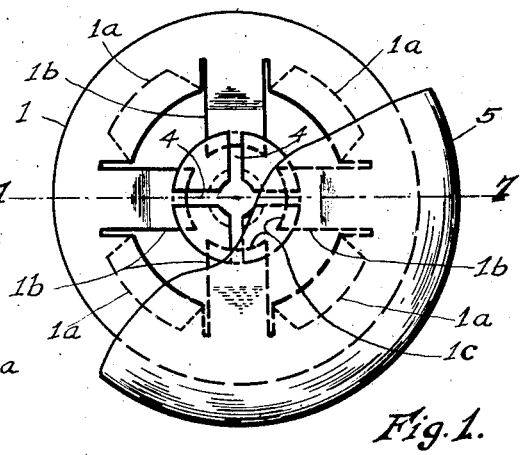
Figure 1 is a plan view of the complete fastener, with the stud and socket members in locked engagement, with a portion of the cover or cap broken away to show the several elements comprising these members.
Figure 7:
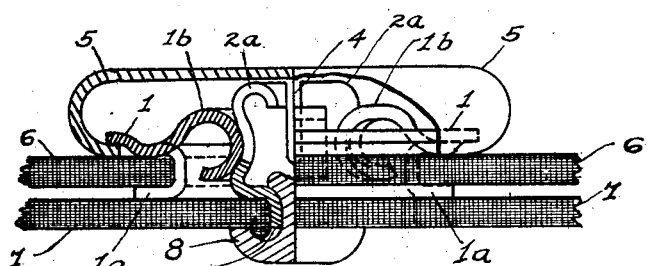
Fig. 7 is a left half-section and a right half-elevation, taken through the diameter 7—7 of Fig. 1, of the complete fastener with the stud and socket members in locked engagement and illustrating the method of attaching each member to its fabric; this view has a portion of the cover or cap broken away to expose the spring elements in such locked engagement.

The cap 5 is pressed out in some such form as that shown in Figs. 1 and 7. The spring member is made from a sheet metal disk struck up to form the base-flange 1 and a series of integral radial segments $1^a$ and $1^b$ extending horizontally inward toward a central opening. The segments $1^b$ are interposed between the V-shaped radial segments $1^a$ and are formed up into circular bulging heads radially disposed about the central opening. These heads comprise the spring-elements of the socket member; they have an inner curvature on the surface facing the central opening, as shown at $1^c$ of Fig. 1, which curvature conforms to that of the stud spring-elements at the portions which engage while in locked relation with each other; these heads extend inwardly far enough to permit the spring-elements of both members to function properly during engagement and disengagement. The V-shaped segments $1^a$, which function as clamping segments, are pressed downwardly through an opening provided in the fabric 6 and then flanged outwardly so as to secure the fabric to the base-flange 1.

Base-flange 1 is upset along its outer rim; beneath this rim cap 5 is fastened by crimping, as is shown in the half-section of Fig. 7.

Figure 2:
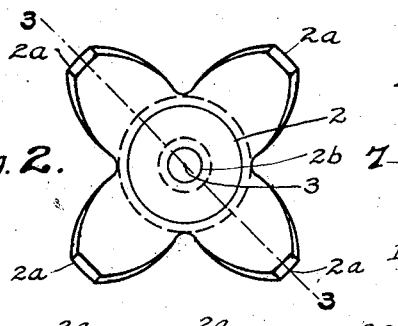
Fig. 2 is a plan view, and Fig. 3, a left half-section and a right half-elevation, of the stud member after the first punching operation from a sheet metal blank.
Figure 3:
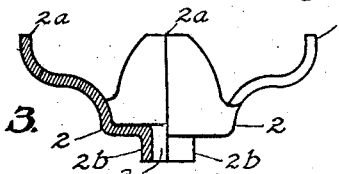

The stud member is likewise made from a sheet metal disk, struck up in the form shown in plan view in Fig. 2 and in left half-section and right half-elevation in Fig. 3. The tongue-portions $2^a$ are then pressed upward from the base-plate 2, and then inwardly where the free ends are axially-indented. Further, portions $2^a$ are formed into sections of a partially-spherical bulging head having radial indentations $2^c$, and are separated by the vertical slots 4. These slots allow the resiliency of the tongue-portions to act when the latter are compressed. A hub 2ᵇ projects below the base-plate 2 about a central opening 3.

Figures 5, 6:
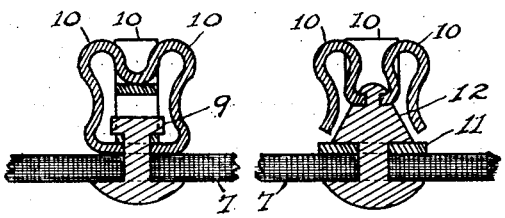
Figs. 5 and 6 are sectional views of modified constructions of the stud member.

In the modified construction shown in section in Fig. 5, the bulging spring-tongues 10 are integral with the axially-indented head but the free ends of these tongues turn in under the rivet head 9 to provide a base for attaching the fabric 7 thereto. This method of construction increases the resiliency of the spring-sections by distributing the bending of said spring-sections, when under compression, over a greater portion of their length.

In Fig. 6, which shows a sectional view of another modification of the stud member, the axially-indented head is rigidly attached, by riveting or other means, to the rivet head 12. The free ends of the bulging spring-tongues are radially-disposed about a cone-shaped head-portion of the attaching means to the fabric 7. This method of construction also allows for a greater distribution of the bending action throughout the spring-tongues 10, thereby preventing breakage, through crystallization of the metal, at any point.

To attach the stud member 2 to its fabric 7, refer to the composite sectional view shown in Fig. 8, showing the rivet or attaching means in the "before" and "after" positions, and proceed as follows:—

Figure 4:
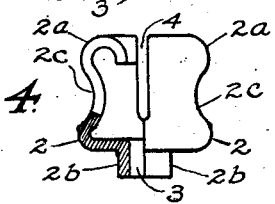
Fig. 4 is a left half-section and a right half-elevation of the stud member after its final forming operation in the press.

The stud member 2 is inverted over a mandrel which has a central upsetting head; this head enters the axial opening between the tongue-portions 2ᵃ, Fig. 4, and rises vertically to a position just below the opening 3. After clamping the stud member in this position, the fabric 7 is placed over the opening 3. A rivet 8 is then positioned directly over the above opening so that the fabric lies between stem-end of the rivet and the opening 3 in the hub 2ᵇ. As the rivet is driven downward it perforates the fabric, passes through the opening, and is upset against the mandrel's upsetting head. This operation attaches the fabric to the base-plate 2 and clenches the edges of the sheared fabric in an annular groove under the head of the rivet 8, thus insuring against accidental tearing of the fabric from the fastener.

Having thus described my invention, what I claim as new, and desire to secure by Letters Patent, is—

1. A resilient-stud member, including an axially-indented head and a plurality of radially-disposed looped spring-elements secured to said head at their upper ends, the free ends of said spring-elements being radially-disposed about a cone-shaped head portion of the fabric attaching means, and being free to move vertically along the outer surface of said head portion.

2. In a spring button such as described, a resilient stud member made from a disk of sheet metal struck up to form an annular base with a central hub projecting downwardly and having an opening therein, a plurality of vertically-projecting radially-disposed looped spring-elements integral with said base and provided with a central indentation and a bulging top-section looped inwardly about a central opening, and a plurality of vertical slots between said spring-elements, substantially as described.

3. The invention as in claim 2, including means for attaching the stud member to the fabric or other material by means of a rivet whose stem portion extends through the central opening in the annular base of said stud member and is clenched to the upper surface of said base, the head portion of said rivet being provided with an inner annular groove which incloses the doubled-back edges of the fabric, thereby securing said fabric between the rivet head and the undersurface of the annular base.

4. In a spring fastener such as described, the combination of a non-resilient cover, of a resilient socket member made from a disk of sheet metal struck up to form an annular rim upset along its outer edge for crimping rim of said cover thereunder, a plurality of horizontal inwardly-projecting spring-sections radially-disposed about a central opening and ending in circular looped heads provided with radially-curved surfaces to conform to the contour of the stud member at their engaging surfaces when in interlocked relation one with the other; and a like plurality of V-shaped clamping segments integral with said annular rim and alternating with said spring-sections about the said central opening, and doubling back under the edge of the opening in the fabric, or other material, for attaching said fabric to the socket member substantially as described.

Signed at New York, in the county of New York and State of New York this 15th day of May, A. D. 1920.

J. O. H. CAZENOVE.